(12) United States Patent
Li

(10) Patent No.: US 8,606,077 B2
(45) Date of Patent: Dec. 10, 2013

(54) METHOD, SYSTEM, USER EQUIPMENT, AND SERVER EQUIPMENT FOR VIDEO FILE PLAYBACK

(75) Inventor: Zhaozao Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 13/335,384

(22) Filed: Dec. 22, 2011

(65) Prior Publication Data

US 2012/0163771 A1 Jun. 28, 2012

(30) Foreign Application Priority Data

Dec. 23, 2010 (CN) .......................... 2010 1 0602764

(51) Int. Cl.
*H04N 5/92* (2006.01)
*H04N 5/7824* (2006.01)
(52) U.S. Cl.
USPC ......................................... 386/241; 386/318
(58) Field of Classification Search
USPC ............................ 386/241, 239, 243, 248, 318
See application file for complete search history.

(56) References Cited

U.S. PATENT DOCUMENTS

| 4,777,537 A | * | 10/1988 | Ueno et al. ..................... 386/239 |
| 2009/0043692 A1 | | 2/2009 | Pippuri et al. |
| 2010/0003006 A1 | * | 1/2010 | Tokunaka ....................... 386/52 |

FOREIGN PATENT DOCUMENTS

| CN | 101252401 A | 8/2008 |
| CN | 101478564 A | 7/2009 |
| WO | WO 2007/004030 A1 | 1/2007 |

* cited by examiner

*Primary Examiner* — Robert Chevalier

(57) ABSTRACT

The present invention provides a video file playing method, and also a corresponding user end. Wherein, a video file is downloaded from a server and added with an index area, where the index area includes a start address, a next file address, a start time; the video file is inserted into a local video file queue, so that a next file address of an index area of a previous video file of the video file is the start address of the index area of the video file, and the next file address of the index area of the video file is a start address of an index area of a next video file of the video file.

9 Claims, 6 Drawing Sheets

METHOD, SYSTEM, USER EQUIPMENT, AND SERVER EQUIPMENT FOR VIDEO FILE PLAYBACK

CROSS-REFERENCE TO RELATED APPLICATIONS

This application claims priority to Chinese Patent Application No. 201010602764.X, filed on Dec. 23, 2010, which is hereby incorporated by reference in its entirety.

FIELD OF THE INVENTION

The present invention relates to the field of Internet technologies, and in particular, to a video file playing method and system, a user end apparatus, and a server apparatus.

BACKGROUND OF THE INVENTION

With the development of the Internet, video surveillance and streaming media on demand have been widely used, and demand for playback of remote video gets increasingly strong. In the prior art, streams are downloaded from a remote server and buffered in a memory for playing. At a server end, video files on the same time axis are stored in the server end in the form of a video file for the user end to download. The video file has an index area and a second-level index area, where the index area includes a start address, a file length, a start time, an end time, file information, and a second-level index, and the second-level index area includes intra frame I frame information, and the I frame information specifically includes a start time of an I frame, an address of an I frame, and private information.

In the study and implementation of the prior art, the inventor of the present invention finds that, in the prior art, streams are downloaded from a remote server and buffered in a memory for playing, and with the advent of a high-definition era, a higher requirement is put forward on memory consumption of terminals, and moreover, it is almost a blank in current application to continuously download different video files on the same time axis.

SUMMARY OF THE INVENTION

Embodiments of the present invention provide a video file playing method and system, a user end apparatus, and a server apparatus, so as to solve the problem that different video files on the same time axis may not be continuously downloaded when a user end downloads a video file from a remote server for playing.

A video file playing method includes:
downloading, by a user end, a video file from a server;
adding an index area to the video file, where the index area comprises a start address, a next file address, and a start time of the video file;
according to the start time of the index area of the video file, inserting the video file into a local video file queue, where a next file address of an index area of a previous video file of the video file is the start address of the index area of the video file, the next file address of an index area of the video file is a start address of an index area of a next video file of the video file, and the video file queue is a large video file formed by splicing multiple video files according to an order of the start time of the index area; and
playing the video file.

A video file playing method includes:
receiving a video file download request message sent by a user end, where the video file download request message carries a play time;
according to the play time, searching for a corresponding video file;
sending the video file to the user end;
after sending the video file, according to a next file address of an index area of the video file, finding a start address of a next video file, where the next file address of an index area of a previous video file is a start address of an index area of a next video file, and multiple video files are spliced into a large video file, namely, a video file queue; and
sending the next video file to the user end, till a last video file in the video file queue or a video file corresponding to a stop time, where the stop time is sent by the user end.

A user end apparatus includes:
a download module, configured to download a video file from a server;
an index area addition module, configured to add an index area to a video file stored by a storage module, where the index area comprises a start address, a next file address, and a start time of the video file;
a video file queue management module, configured to, according to the start time of the index area of the video file, insert the video file into a local video file queue, where a next file address of an index area of a previous video file of the video file is a start address of the index area of the video file, the next file address of the index area of the video file is a start address of an index area of a next video file of the video file, and the video file queue is a large video file formed by splicing multiple video files according to the order of the start time of the index area; and
a play module, configured to play the video file that is inserted into the video file queue by the video file queue management module.

A server apparatus includes:
a receiving module, configured to receive a video file download request message sent by a user end, where the video file download request message carries a play time;
a searching module, configured to, according to the play time that is received by the receiving module, search for a corresponding video file; and
a sending module, configured to send the video file found by the searching module to the user end, and after sending the video file, according to a next file address of an index area of the video file, find a start address of a next video file, and send the next video file to the user end, till the last video file in a video file queue or a video file corresponding to a stop time, where the stop time is sent by the user end; the video file queue is a large video file formed by splicing multiple video files according to the order of the start time of the index area, and a next file address of an index area of a previous video file is a start address of an index area of a next video file.

A video file playing system includes:
the user end apparatus mentioned above and the server apparatus mentioned above.

According to the embodiments of the present invention, the user end downloads a video file from the server. An index area is added to the video file, where the index area includes a start address, a next file address, and a start time, and the video file is inserted into a local video file queue according to the start time of the index area of the video file, so that a next file address of an index area of a previous video file of the video file is the start address of the index area of the video file, and the next file address of the index area of the video file is a start address of an index area of a next video file of the video file, where the video file queue is a large video file formed by splicing multiple video files according to the order of the start time of the index area; and then a received video file is played. In this way, different video files on the same time axis may be continuously downloaded in no particular order, and the video files that are discontinuously stored may be played in the order of time. Moreover, as the video files are stored locally, it may not consume a large amount of memory when the video files are played back.

DETAILED DESCRIPTION OF THE EMBODIMENTS

Embodiments of the present invention provide a video file playing method, and further provide a corresponding system, a user end apparatus, and a server apparatus. Details are described respectively in the following.

Figure 1:
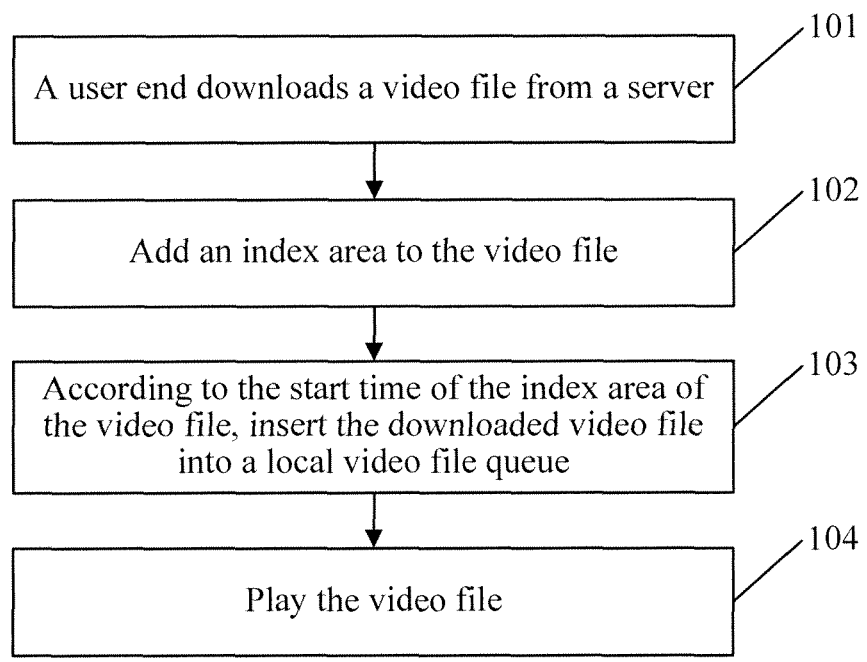
FIG. 1 is a schematic data flow chart of a video file playing method according to an embodiment of the present invention.

Referring to FIG. 1, Embodiment 1 of a video file playing method according to the present invention specifically includes:

101: A user end downloads a video file from a server.

102: Add an index area to the video file.

The downloaded video file is added with an index area, and the index area includes items of a start address, a next file address, and a start time of the video file.

103: According to the start time of the index area of the video file, insert the downloaded video file into a local video file queue.

The index area of the video file includes the items of a start address, a next file address, and a start time, and according to the start time of the index area of the video file, the video file is inserted into a local video file queue. The video file queue is a large video file formed by splicing multiple video files according to an order of the start time of index areas, and the video files that form the video file queue are on a same time axis. The downloaded video file is inserted into the video file queue, so that a next file address of an index area of a previous video file of the video file is the start address of the index area of the video file, and the next file address of the index area of the video file is a start address of an index area of a next video file of the video file.

104: Play the video file.

In this embodiment, the user end downloads a video file from the server. The video file is added with an index area, where the index area includes a start address, a next file address, and a start time. According to the start time of the index area of the video file, the video file is inserted into a local video file queue, so that a next file address of an index area of a previous video file of the video file is a start address of an index area of the video file, and the next file address of the index area of the video file is a start address of an index area of a next video file of the video file, where the video file queue is a large video file formed by splicing multiple video files according to the order of the start time of the index area. Then, the received video file is played. In this way, different video files on the same time axis can be continuously downloaded in no particular order, and the video files that are discontinuously stored may be played in the order of time. Moreover, as the video files are stored locally, it may not consume a large amount of memory when the video files are played back.

Figure 2:
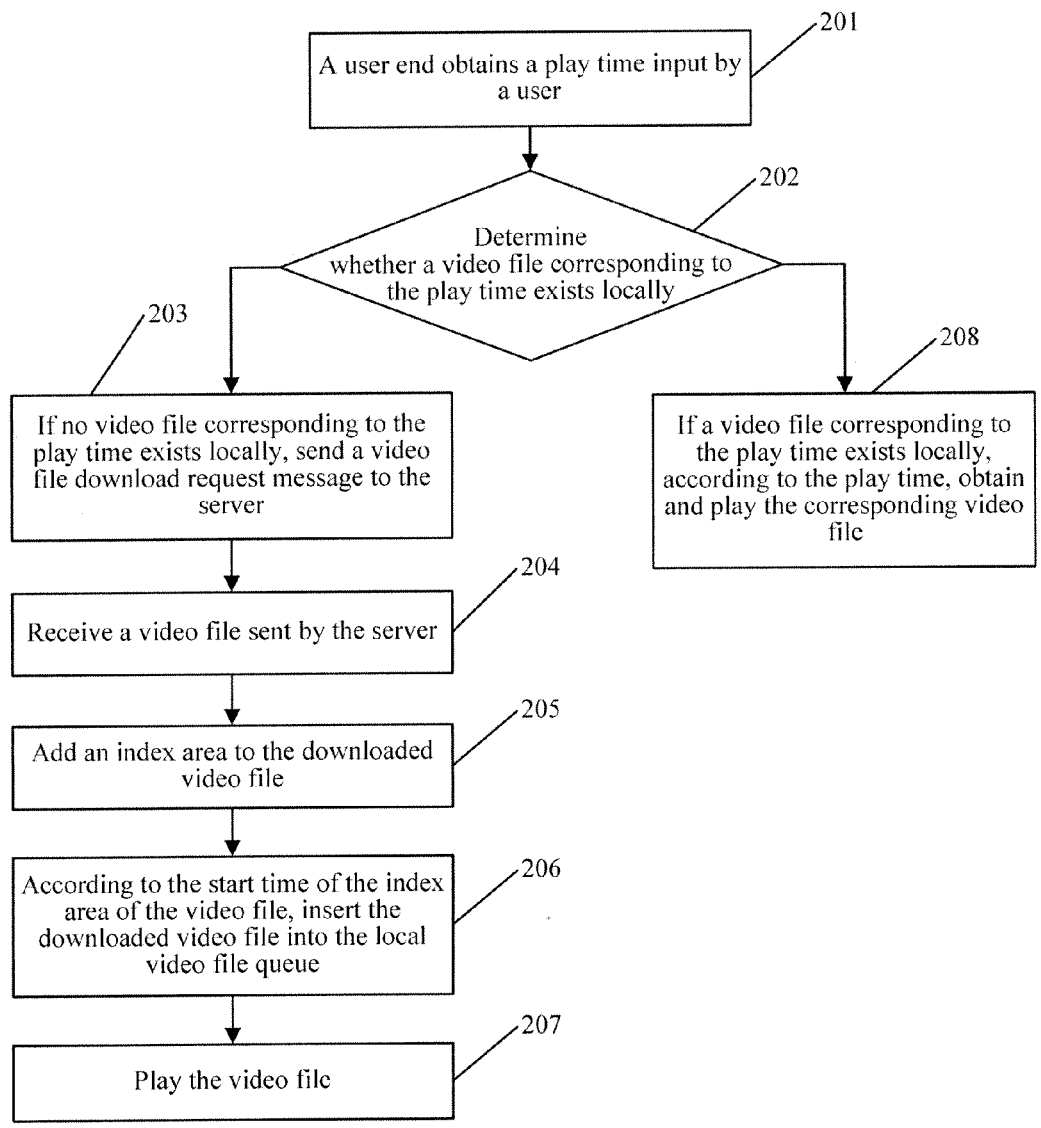
FIG. 2 is a schematic data flow chart of a video file playing method according to an embodiment of the present invention.

Referring to FIG. 2, Embodiment 2 of a video file playing method according to the present invention includes the following steps:

201: A user end obtains a play time input by a user.

The user end obtains the play time input by the user. Specifically, the user end obtains a position that is sought by the user on a play progress bar, a ratio of the seek position to a total length of the play progress bar is calculated, and the start time of the first video file is added to a value obtained by multiplying a total play time by the ratio, so as to obtain a play time; or obtains a play time directly input by the user.

202: Determine whether a video file corresponding to the play time exists locally.

After obtaining the play time in step 201, according to the play time, search in a local video file queue stored locally, and determine whether a video file corresponding to the play time exists. Specifically:

As for different video files on the same time axis, after downloading video files, the user end stores the video files locally to form a video file queue. The video files in the video file queue may not be stored in a certain order with respect to a physical storage order, the video files that are downloaded earlier are stored in front, and the video files that are downloaded latter are stored in the back. However, in playing, the video files are played in the order of the start time of the index area of the video file. For example, the start time and the end time of a video file A that is downloaded firstly are respectively 14:00 and 15:00; and the start time and the end time of a video file video file B that is downloaded secondly are respectively 10:00 and 11:00, as the start time of the video file B is before the start time of the video file A, a start address of an index area of the video file A serves as a next file address of an index area of the video file B. The start time and the end time of a video file C that is downloaded thirdly are respectively 16:00 and 18:00, as the start time of the video file C is after the start time of the video file A, a start address of an index area of the video file C serves as a next file address of the index area of the video file A. Therefore, the physical storage order of the three video files is A→B→C, and a play order is B→A→C. After playing the video file B, according to the next file address of the index area of the video file B, the start address of the video file A is found, and the video file A is continuously played, and after playing the video file A, according to the next file address of the index area of the video file A, the start address of the video file C is found, and the video file C is continuously played.

In play order, the play time input by the user is compared with the end time of the index areas of the video files of the local video file queue, to determine whether the play time input by the user exits in one of the video file of the local video file queue. The first video file, end time of which is after the play time, is obtained as the video file corresponding to the play time.

203: If no video file corresponding to the play time exists locally, send a video file download request message to the server.

In step 202, if a comparison result is that the play time is before a start time of an index area of the first video file in the local video file queue, or that the play time is after a start time of an index area of the last video file in the video file queue, it indicates that no video file corresponding to the play time exists locally and it is required to download a corresponding video file from the server, and then a video file download request message is sent to the server, where the video file download request message carries the play time.

204: Receive a video file sent by the server.

After receiving the video file download request message sent by the user end, according to the play time carried by the video file download request message, the server seeks for an I frame of a second-level index area of a video file corresponding to the play time in a preset video file queue that is stored at a server end, and starting from the I frame, sends the video file to the user end, where the video file queue is formed by splicing multiple video files on the same time axis in the order of the start time of the index area, and a next file address of an index area of a previous video file is a start address of an index area of a next video file.

Specifically:

First, whether the play time is before an end time of an index area of the first video file in the local video file queue is determined; if the play time is not before an end time of an index area of the first video file, according to a next file address of the index area of the first video file, an index area of a next video file is found, and whether the play time is before an end time of the index area of a next video file is determined; and the above steps are repeated, till a video file that the play time is before an end time of an index area of the video file is found.

Next, the play time is compared with a start time of the first I frame of a second-level index area of the video file that the play time is before the end time of the index area of the video file; if the play time is after the start time of the I frame, whether the play time is before or equal to a start time of a next I frame is determined; the above steps are repeated, till an I frame that the play time is before or equal to a start time of the I frame is found, if the play time is equal to the start time of the I frame, the video file is sent, starting from the I frame, to the user end; and if the play time is before the start time of the I frame, the video file is sent starting from a previous I frame of the I frame, to the user end.

When the first I frame is received, according to the start time of the I frame, the position of the I frame in the video file queue is located. Specifically, the start time of the I frame is compared with the start time of the first video file in the video file queue, and if the start time of the I frame is after the start time of the first video file, according to a next video file of the index area of the first video file, a second video file is found, and the start time of the I frame is compared with a start time of the second video file, and the above steps are repeated, till a video file of which the start time is after the I frame is found, and the position of the first I frame is before the video file that is found.

When an I frame following a second I frame is received, according to the start time of the I frame, whether the I frame already exists in the video file queue is determined. Specifically, when an I frame following the second I frame is received, the start time of the I frame is compared with the start time of the video file that is found, if the start time of the I frame is equal to the start time of the video file that is found, indicating that the video file where the I frame is located already exists at the user end, in this case, the user end sends a stop download message to the server, and the server stops sending the video file to the user end.

205: Add an index area to the downloaded video file.

The video file that is received by the user end does not have an index area, therefore, in order to insert the received video file into the local video file queue stored locally, it is required to add an index area to the received video file, where the index area includes items of a start time, a file length, an end time, file information, a next file address, and a second-level index.

206: According to the start time of the index area of the video file, insert the downloaded video file into the local video file queue.

As the first I frame has been located in step 204, the received video file is directly inserted at the position where the first I frame is located.

207: Play the video file.

Further, when a last intra frame of a certain video file is played, if no video file exists at a physical address that is found according to the next file address of the index area of the video file, a video file download request message is sent to the server, where the video file download request message carries a play time, and the play time is equal to a start time of the last intra frame.

208: If a video file corresponding to the play time exists locally, according to the play time, obtain and play the corresponding video file.

If the comparison result in step 202 is that a video file corresponding to the play time exists locally, the video file is obtained and played. Specifically:

Whether the play time is before or equal to the end time of the index area of the first video file in the local video file queue is determined; if the play time is after the end time of the index area of the first video file in the video file queue, according to the next file address of the index area of the first video file, a next video file is found, and whether the play time is before or equal to an end time of the index area of the next video file is determined; the above steps are repeated, till a video file that the play time is before or equal to an end time of the index area is found.

If a video file that the play time is equal to an end time of an index area of the video file is found, the video file is played from the first I frame of a second-level index area of the video file.

If a video file that the play time is before an end time of an index area of the video file is found, the play time is compared with a start time of the first I frame of a second-level index area of the video file; if the play time is after the start time of the I frame, whether the play time is before or equal to a start time of a next I frame is determined; the above steps are repeated, till an I frame that the play time is before or equal to the start time of the I frame is found, if the play time is equal to the start time of the I frame, the video file is played from the I frame; and if the play time is before the start time of the I frame, the video file is played from a previous I frame of the I frame.

In this embodiment, the user end downloads a video file from the server. An index area is added to the video file, where the index area includes a start address, a next file address, and a start time. According to the start time of the index area of the video file, the video file is inserted into the local video file queue, so that a next file address of an index area of a previous video file of the video file is the start address the index area of the video file, and the next file address of the index area of the video file is a start address of an index area of a next video file of the video file, where the video file queue is a large video file formed by splicing multiple video files according to the order of the start time of the index area. Then, the received video file is played. In this way, different video files on the same time axis may be continuously downloaded in no particular order, and the video files that are discontinuously stored may be played in the order of time. Moreover, as the video files are stored locally, it may not consume a large amount of memory when the video files are played back.

Figure 3:
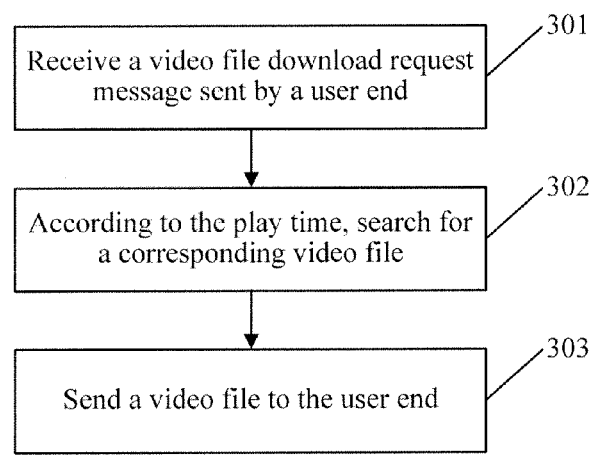
FIG. 3 is a schematic data flow chart of a video file playing method according to an embodiment of the present invention.

Referring to FIG. 3, Embodiment 3 of a video file playing method according to the present invention specifically includes:

301: Receive a video file download request message sent by a user end.

The server receives a video file download request message sent by the user end, where the video file download request message carries a play time.

302: According to the play time, search for a corresponding video file.

The server, according to the play time that is carried in the received video file download request message, searches for an I frame of a second-level index area of a video file corresponding to the play time in a preset video file queue preset at a server end, and starting from the I frame, send the video file to the user end, where the video file queue is formed by splicing multiple video files on the same time axis according to the order of the start time of the index area, and a next file address of an index area of a previous video file is a start address of an index area of a next video file.

Specifically:

First, whether the play time is before an end time of an index area of the first video file is determined; if the play time is not before an end time of an index area of the first video file, according to a next file address of the index area of the first video file, an index area of a next video file is found, and whether the play time is before an end time of the index area of a next video file is determined; and the above steps are repeated, till a video file that the play time is before an end time of an index area of the video file is found.

Next, the play time is compared with a start time of the first I frame of a second-level index area of the video file that the play time is before the end time of the index area of the video file; if the play time is after the start time of the I frame, whether the play time is before or equal to a start time of a next I frame is determined; the above steps are repeated, till an I frame that the play time is before or equal to a start time of the I frame is found.

303: Send a video file to the user end.

In step 302, if an I frame of the video file is found and the play time is equal to a start time of the I frame, the video file is sent, starting from the I frame, to the user end; and if the play time is before the start time of the I frame, the video file is sent, starting from a previous I frame of the I frame, to the user end.

After one video file has been sent, if a tail of a video file queue is not reached, or a stop time sent by the user end is not reached, a next video file is found according to the next file address of the index area of the video file, and starting from the first I frame of the next video file, the next video file is sent to the user end.

In this embodiment, through splicing multiple video files on the same time axis to form a video file queue at the server end, the user end may download the video files respectively and then play the video files, but is not required to download all the video files on the same time axis for playing. Moreover, starting from the I frame, the server end sends the video files to the user end for playing, so that that an incomplete image may not be presented when the user end plays the video files.

Figure 4:
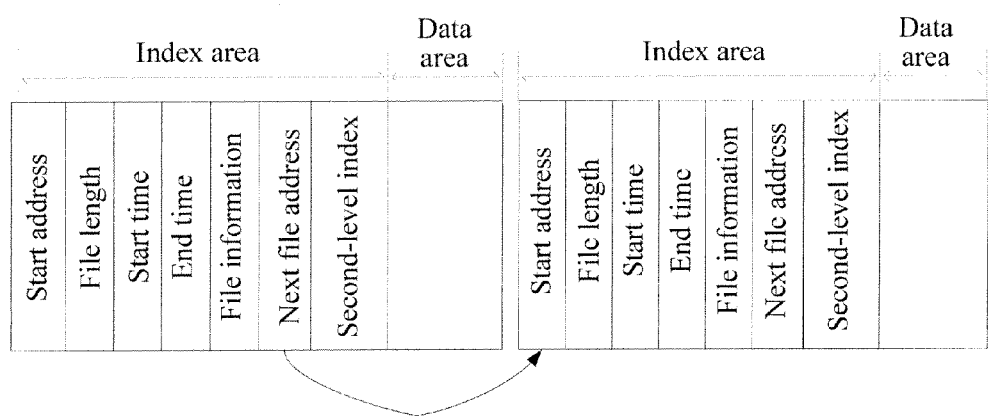
FIG. 4 is a schematic diagram of an index area of a video file according to an embodiment of the present invention.
Figure 5:
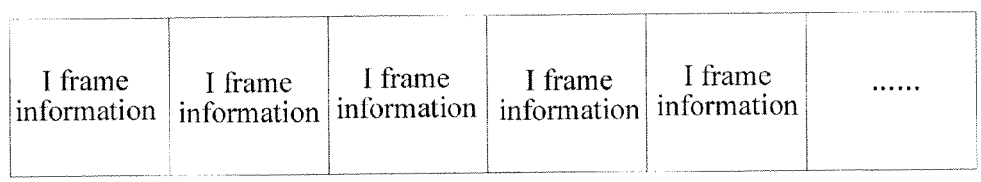
FIG. 5 is a schematic diagram of a second-level index area of a video file according to an embodiment of the present invention.
Figure 6:
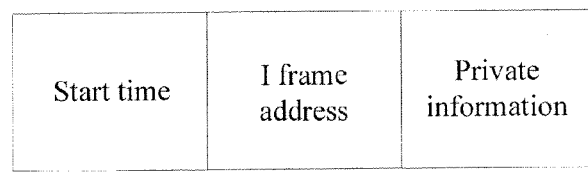
FIG. 6 is a schematic diagram of I frame information according to an embodiment of the present invention.

Referring to FIG. 4 to FIG. 7, an application example according to the present invention is described below:

The storage format of each file at the server is shown in FIG. 4, and includes an index area and a data area, where the index area includes a start address, a file length, a start time, an end time, file information, a next file address, and a second-level index area. The second-level index area is shown in FIG. 5, and stores information of each I frame. The storage format of the information of each I frame is shown in FIG. 6, and the start time of each I frame, the address and private information of each I frame, such as alarm information, are stored.

For example, four video files exist on the server. Data of a first-level index area of a first video file A includes the following: the start address is 0, the file length is 3, the start time is 12:00:00, Sep. 1, 2010, the end time is 15:00:00, Sep. 1, 2010, and the next file address is 3.

Data of a first-level index area of a second video file B includes the following: the start address is 3, the file length is 5, the start time is 22:00:00, Sep. 1, 2010, the end time is 03:00:00, Sep. 2, 2010, and the next file address is 8.

Data of a first-level index area of a third video file C includes the following: the start address is 8, the file length is 4, the start time is 10:00:00, Sep. 2, 2010, the end time is 14:00:00, Sep. 2, 2010, and the next file address is 12.

Data of a first-level index area of a fourth video file D includes the following: the start address is 12, the file length is 3, the start time is 17:00:00, Sep. 2, 2010, the end time is 20:00:00, Sep. 2, 2010, and the next file address is 15.

The user inputs a start time and an end time at a terminal, so as to conveniently view data information of the video files stored in a remote server. Specifically:

First step: The server compares the end time that is input with the start time of the first video file, if the start time of the first video file is after the end time that is input, it indicating that no video file meeting the requirement exists in the remote server, the seek fails.

Second step: If the start time of the video file A is before the end time that is input, compare the end time of the video file A with the start time that is input, if the start time that is input is after the end time of the video file A, compare the end time of the video file B with the start time that is input, and the above steps are repeated, till the start time that is input is before an end time of a video file stored locally.

Third step: From the sought video file of which the end time is after the start time that is input, compare the end time that is input with the end time of the video file, till the end time that is input is before or equal to an end time of a video file.

If no video file stored locally that the end time that is input is before an end time of the video file is not found by seeking in the second step, the seek fails.

Figure 7:
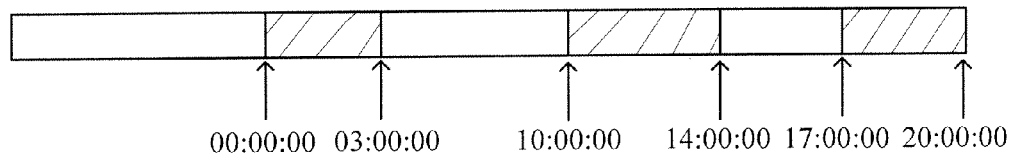
FIG. 7 is a schematic diagram of a seek result in an application example according to the present invention.

Through the seek method mentioned above, if the start time input by the user is 00:00:00, Sep. 2, 2010, the end time is 00:00:00, Sep. 3, 2010, after the terminal sends the start time and the end time to the remote server, data information of video files that meets the requirement is displayed on the terminal for the user, as shown in shaded parts in FIG. 7. The seek result is files from 00:00:00 to 03:00:00, files from 10:00:00 to 14:00:00, and files from 17:00:00 to 20:00:00, Sep. 2, 2010.

The user performs a first Seek operation on the time axis, if the Seek play time is 22:00:00 Sep. 1, 2010, the play time is calculated, which specifically includes: the user end obtains a position that is sought by the user on the play progress bar, calculates a ratio of the seek position to a total length of the play progress bar, adds the start time of the first video file to a value obtained by multiplying a total play time by the ratio, so as to obtain the play time; or obtains the play time directly input by the user.

The user sends a video file download request message to the server, where the message carries the play time.

The server receives the video file download request message, and according to the play time carried by the message, searches for a corresponding video file. Specifically:

The server stores multiple video files on the same time axis, and splices the multiple video files into a video file queue according to the order of the start time, so that a next file address of an index area of a previous video file is a start address of an index area of a next video file, and the order of the video file queue is video file A→video file B→video file C→video file D.

The play time is 22:00:00, Sep. 1, 2010, the end time of the index area of the video file A is 15:00:00, Sep. 1, 2010, and the play time is after the end time of the index area of the video file A, and according to the next file address of the video file A, an index area of the next video file, that is, the index area of the video file B, is found. The end time of the index area of the video file B is 03:00:00 Sep. 2, 2010, and the play time is before the end time of the index area of the video file B. Then the play time is compared with a start time of the first I frame of the index area of the video file B, the start time of the first I frame of the index area of the video file B is 22:00:00, Sep. 1, 2010, and is equivalent to the play time, indicating that the I frame corresponding to the play time is found.

The server sends, starting from the I frame that is found, the video file to the user end.

The user end receives the video file and plays the video file, and stores the video file in a local hard disk. When the video file is played to a time point of 03:00:00, Sep. 2, 2010, the user performs an operation of stop playing. In this case, the user end sends a stop time to the server end, and the server stops sending the video file. The server adds an index area to the video file, that is, the video file B, and the index area includes the following: the start address is 0, the file length is 5, the start time is 22:00:00, Sep. 1, 2010, the end time is 03:00:00, Sep. 2, 2010, and the next file address is 5.

The user performs a second Seek operation on the time axis, and if the Seek play time is 12:00:00, Sep. 1, 2010,
 the user end determines whether a video file corresponding to the play time exists locally. Specifically:

From the first video file in the local video file queue, that is, from the video file B, the play time is compared with the end time of the index area of the video file, if the play time is after the end time of the index area of the video file, according to the next File address of the index area of the video file, a next video file is found. The play time is compared with an end time of an index area of the next video file, and the above steps are repeated, till comparison is performed on the last video file. As only video File B exists locally, and the end time of the index area of the video file B is 03:00:00, Sep. 2, 2010, the play time is 12:00:00, Sep. 1, 2010, and the play time is after the end time of the index area of the video file B, no video file corresponding to the play time exists in the local video file queue, and the video file needs to be downloaded from the server.

The user sends a video file download request message to the server, where the message carries the play time.

The server receives the video file download request message, and according to the play time carried by the message, searches for a corresponding video file. Specifically:

The play time is 12:00:00, Sep. 1, 2010, the end time of the index area of the video file B is 03:00:00, Sep. 2, 2010, and the play time is before the end time of the index area of the video file B. The play time is compared with an start time of the first I frame of the index area of the video file B, the start time of the first I frame of the index area of the video file B is 12:00:00, Sep. 1, 2010, and is equivalent to the play time, indicating that the I frame corresponding to the play time is found.

The server sends, starting from the I frame that is found, the video file to the user end.

The user end receives the video file. When receiving the first I frame, according to the start time of the I frame, the user end rapidly locates a position where the I frame should be inserted into the video file queue. Specifically, the start time of the I frame is compared with a start time of the first video file in the video file queue, if the start time of the I frame is after the start time of the first video file, according to a next video file of the index area of the first video file, a second video file is found. Then the start time of the I frame is compared with a start time of the second video file. The above steps are repeated, till a video file of which the start time is after that of the I frame is found. When an I frame following the second I frame is received, a start time of the I frame is compared with the start time of the video file that is found; if the start time of the I frame is equal to the start time of the video file that is found, the user end sends a stop download message to the server, and the server stops sending the video file to the user end. In this application example, the first I frame that is received in the second Seek operation is located before the video file B.

The user end plays the video file and stores the video file in the local hard disk. When the video file is played to a time point of 14:00:00, Sep. 1, 2010, the user performs an operation of stop playing. In this case, the user end sends a stop time to the server end, and the server stops sending the video file. The server adds an index area to the video file A1, and the index area specifically includes the following: the start address is 5, the file length is 2, the start time is 12:00:00, Sep. 1, 2010, the end time is 14:00:00, Sep. 1, 2010, and the next file address is 7.

According to the start time of the index area of the video file, the video file that is downloaded into the local video file queue, and because the first I frame of the received video file has been located, the received video file is directly inserted before the video file B. Specifically:

A next file address of an index area of the received video file is changed to the start address of the index area of the video file B.

The user performs a third Seek operation on the time axis, and if the Seek play time is 14:30:00, Sep. 1, 2010,
 the user end determines whether a video file corresponding to the play time exists locally. Specifically:

From the first video file in the local video file queue, the play time is compared with the end time of the index area of the video file, if the play time is after the end time of the index area of the video file, according to the next file address of the index area of the video file, a next video file is found. The play time is compared with an end time of an index area of the next video file, and the above steps are repeated, till comparison is performed on the last video file. The end time of the index area of the video file A1 is 14:00:00, Sep. 1, 2010, the play time is 14:30:00, Sep. 1, 2010, and the play time is after the end time of the index area of the video file A1. According to the next file address of the index area of the video file A1, a video file B is found, the play time is compared with a start time of an index area of the video file B. The end time of the index area of the video file B is 03:00:00, Sep. 2, 2010, and is after the play time. From the first I frame of the video file B, the play time is compared with the start time of the I frame. The start time of the first I frame of the video file B is 22:00:00, Sep. 1, 2010, and is after the play time, indicating that no video file corresponding to the play time exists in the local video file queue, and the video files needs to be downloaded from the server.

The user sends a video file download request message to the server, where the message carries the play time.

The server receives the video file download request message, and according to the play time carried by the message, searches for a corresponding video file. Specifically:

The play time is 14:30:00, Sep. 1, 2010, and the first video file in the video file queue, that is, the video file A, of which the end time of the index area is 15:00:00, Sep. 1, 2010, and the play time is before the end time of the index area of the first video file. Then the start time of the first I frame of the video file A is compared with the play time, the start time of the first I frame of the video file A is 12:00:00, Sep. 1, 2010, and is before the play time. The start time of the second I frame is compared with the play time. The above steps are repeated, till an frame of which the start time is after or equal to the play time is found. If the start time of the frame is equal to the play time, the video file is sent to the user end from the I frame; and if the start time of the I frame is after the play time, starting from a previous I frame of the I frame, the video file is sent to the user end.

The user end receives the video file. When receiving the first I frame, according to the start time of the I frame, the user end rapidly locates a position where the I frame should be inserted into the video file queue. In this application example, the first I frame received in the third Seek operation is located between the video file B and the video file A1.

The user end plays the video file and stores the video file in a local hard disk. When the video file is played to a time point of 14:45:00, Sep. 1, 2010, the user performs an operation of stop playing. In this case, the user end sends a stop time to the server end, and the server stops sending the video file. The server adds an index area to the video file A2, and the index area specifically includes the following: the start address is 7, the file length is 0.25, the start time is 14:30:00, Sep. 1, 2010, the end time is 14:45:00, Sep. 1, 2010, and the next file address is 7.25

According to the start time of the index area of the video file, the downloaded video file A2 is inserted into the local video file queue. As the first I frame of the received video file has been located, the received video file is directly inserted after the video file A1 and before the video file B. Specifically:

The next file address of the video file A2 is changed to the next file address of the video file A1, that is, the start address of the video file B, and the next file address of the video file A1 is changed to the start address of the video file A2, so the play order of the video file queue is: A1→A2→B.

The user performs a fourth Seek operation on the time axis, and if the Seek play time is 14:50:00, Sep. 1, 2010, the method is the same as that in the first to third Seek operation, and details are repeated herein.

When the start time of the received I frame is 22:00:00, Sep. 1, 2010, the start time of the I frame is the same with the start time of the video file B, indicating that the video files from the I frame already exists locally at the user end and it is merely required to obtain data from the local hard disk for playing, but not required to download the video file from the server. Therefore, the user end sends a stop download message to the server, and the server stops sending the video file to the user end.

When the user end plays an I frame of which the start time is 03:00:00, Sep. 2, 2010, the user end finds that no video file exists at the next file address of the index area of the video file B, indicating that it is required to download the video file from the server end, so the user end sends a video file download request message, where the message carries the play time, here the start time of the last I frame is 03:00:00, Sep. 2, 2010. The server sends, starting from the I frame, the video file to the user end, in which the start time of the I frame is 03:00:00, Sep. 2, 2010. After receiving the I frame, the user end locates the I frame, and receives a subsequent I frame. As for an I frame already exists locally, the user end may choose to discard or reserve the I frame, which is not limited herein.

In this embodiment, the user end downloads a video file from the server. An index area is added to the video file, where the index area includes a start address, a next file address, and a start time. According to the start time of the index area of the video file, the video file is inserted into the local video file queue, so that a next file address of an index area of a previous video file of the video file is the start address the index area of the video file, and the next file address of the index area of the video file is a start address of an index area of a next video file of the video file, where the video file queue is a large video file formed by splicing multiple video files according to the order of the start time of the index area. Then, the received video file is played. In this way, different video files on the same time axis may be continuously downloaded in no particular order, and the video files that are discontinuously stored may be played in the order of time. Moreover, as the video files are stored locally, it may not consume a large amount of memory when the video files are played back. Further, the user end sends the start time and the end time to the server, the server searches for data information of all video files between the start time and the end time, and sends the data information to the user end, and the user end rapidly display the data information on the time axis, so that the user may conveniently view the data information of the video files stored in the remote server.

Figure 8A:
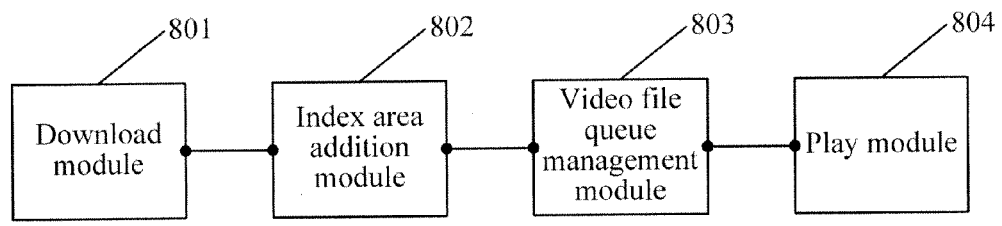
FIG. 8*a* is a schematic logic structural diagram of a user end apparatus according to an embodiment of the present invention.
Figure 8B:
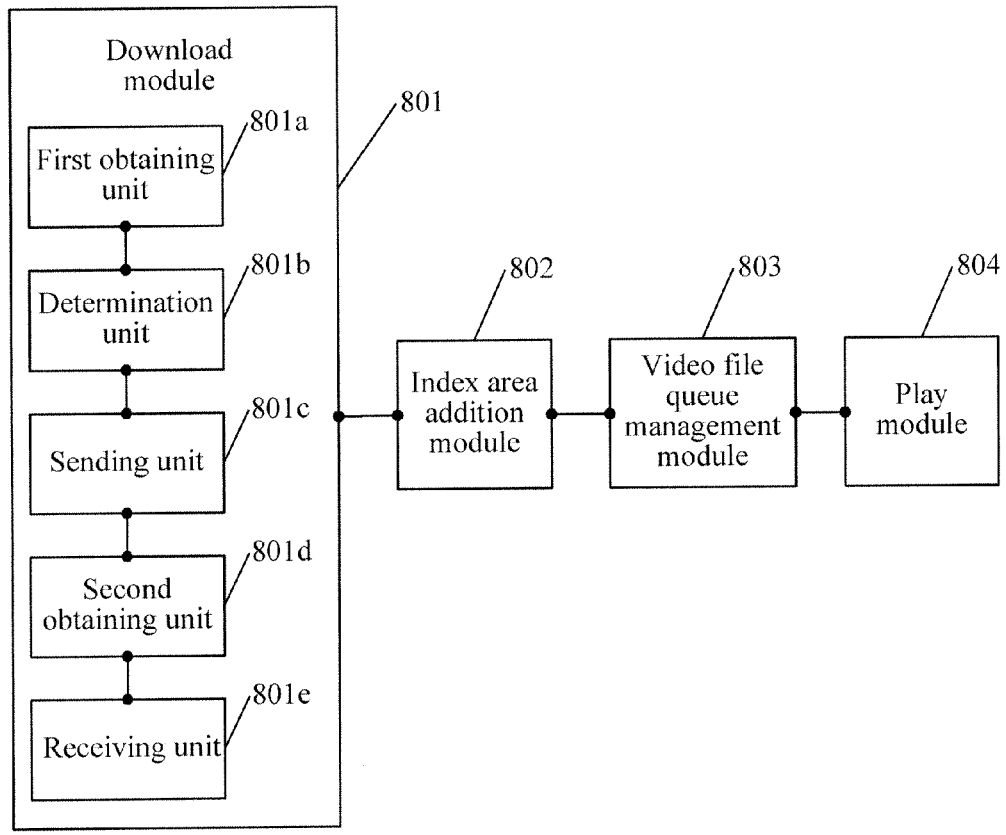
FIG. 8*b* is a schematic logic structural diagram of a user end apparatus according to an embodiment of the present invention.

Referring to FIG. 8a and FIG. 8b, Embodiment 5 of a user end apparatus according to the present invention specifically includes:

a download module 801, configured to download a video file from a server.

an index area addition module 802, configured to add an index area to a video file stored by a storage module, where the index area includes a start address, a next file address, and a start time of the video file;

a video file queue management module 803, configured to, according to the start time of the index area of the video file, insert the video file into a local video file queue, where a next file address of an index area of a previous video file of the video file is the start address of the index area of the video file, and the next file address of the index area of the video file is a start address of an index area of a next video file of the video file, and the video file queue is a large video file formed by splicing multiple video files according to the order of the start time of the index area; and a play module 804, configured to play the video file that is inserted into the video file queue by the video file queue management module.

Further, referring to FIG. 8*b*, the download module 801 includes:

a first obtaining unit 801*a*, configured to obtain a play time input by the user; specifically, the first obtaining unit 801*a* includes: an obtaining unit, configured to obtain a position that is sought on a play progress bar by the user; and a play time calculation unit, configured to calculate a ratio of the seek position obtained by the obtaining unit to a total length of the play progress bar, and add the start time of the first video file to a value obtained by multiplying a total play time by the ratio, so as to obtain a play time;

a determination unit 801*b*, configured to determine whether a video file corresponding to the play time obtained by the obtaining module exists locally;

a sending unit 801*c*, configured to, when the determination unit determines that no video file corresponding to the play time obtained by the obtaining module exists locally, send a video file download request message to the server, where the video file download request message carries the play time;

a second obtaining unit 801*d*, configured to, when the determination unit determines that a video file corresponding to the play time obtained by the obtaining module exists locally, obtain the video file; specifically, the second obtaining unit 801*d* includes:

a first searching unit, configured to, from the first video file in the video file queue, determine whether the play time is before or equal to the start time of the index area of the video files in the video file queue, till a video file that the play time is before or equal to a start time of an index area of the video file is found;

a second searching unit, configured to, when the first searching unit finds a video file that the play time is before the start time of the index area of the video file, starting from the first I frame of the video file, determine whether the play time is before or equal to the start time of the I frames, till an I frame that the play time is before or equal to the start time of the I frame is found;

a sending unit, configured to, when the first searching unit finds a video file that the play time is equal to the start time of the index area, starting from the first I frame of a second-level index area of the video, send the video file to the play module for playing; when the second searching unit finds an I frame that the play time is equal to the start time of the I frame, send the video file from the I frame to the play module for playing; and when the second searching unit finds an I frame that the play time is before the start time of the I frame, starting from a previous I frame of the I frame, send the video file to the play module for playing; and a receiving unit 801*e*, configured to receive the video file sent by the server.

In this embodiment, the user end downloads a video file from the server. An index area is added to the video file, where the index area includes a start address, a next file address, and a start time. According to the start time of the index area of the video file, the video file is inserted into the local video file queue, so that a next file address of an index area of a previous video file of the video file is the start address the index area of the video file, and the next file address of the index area of the video file is a start address of an index area of a next video file of the video file, where the video file queue is a large video file formed by splicing multiple video files according to the order of the start time of the index area. Then, the received video file is played. In this way, different video files on the same time axis may be continuously downloaded in no particular order, and the video files that are discontinuously stored may be played in the order of time. Moreover, as the video files are stored locally, it may not consume a large amount of memory when the video files are played back.

Figure 9A:
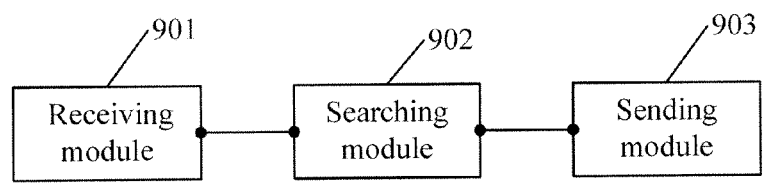
FIG. 9*a* is a schematic logic structural diagram of a server apparatus according to an embodiment of the present invention.
Figure 9B:
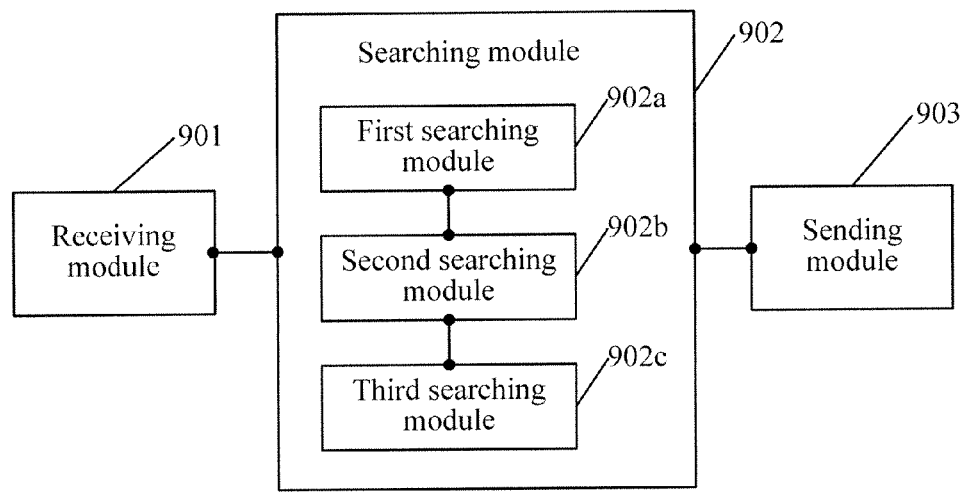
FIG. 9*b* is a schematic logic structural diagram of a server apparatus according to an embodiment of the present invention.

Referring to FIG. 9*a* and FIG. 9*b*, Embodiment 6 of a user end apparatus according to the present invention specifically includes:

a receiving module 901, configured to receive a video file download request message sent by a user end, where the video file download request message carries a play time;

a searching module 902, configured to, according to the play time received by the receiving module, search for a corresponding video file;

a sending module 903, configured to send the video file found by the searching module to the user end, and after the video file is sent, according to a next file address of an index area of the video file, find a start address of a next video file and send the next video file to the user end, till the last video file in the video file queue or a video file corresponding to a stop time, where the stop time is sent by the user end; and the video file queue is a large video file formed by splicing multiple video files according to the order of the start time of the index area, and a next file address of an index area of a previous video file is a start address of an index area of a next video file.

As shown in FIG. 9*b*, further, the searching module 902 includes:

a first searching unit 902*a*, configured to, from the first video file in the video file queue, determine whether the play time is before or equal to the start time of the index area of the video files in the video file queue, till a video file that the play time is before or equal to a start time of an index area of the video file is found;

a second searching unit 902*b*, configured to, when the first searching unit finds a video file that the play time is before a start time of an index area of the video file, from the first I frame of the video file, determine whether the play time is before or equal to a start time of each I frame, till an I frame that the play time is before or equal to a start time of the intra frame is found; and a sending unit 902*c*, configured to, when the first searching unit finds a video file that the play time is equal to a start time of an index area of the video file, starting from the first I frame of a second-level index area of the video file, send the video file to the user end; and when the second searching unit finds an intra frame that the play time is equal to a start time of the intra frame, starting from the intra frame send the video file to the user end; and when the second searching unit finds an intra frame that the play time is before a start time of the intra frame, send the video file from a previous intra frame of the intra frame to the user end.

In this embodiment, through splicing multiple video files on the same time axis to form a video file queue at the server end, the user end may download the video files respectively and play the video files, but are not required to download all the video files on the same time axis for playing. Moreover, the server end sends the video files from the I frame to the user end for playing, so that an incomplete image may not be presented when the user end plays the video file.

Figure 10:
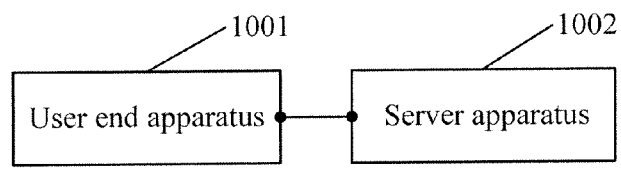
FIG. 10 is a schematic logic structural diagram of a video file playing system according to an embodiment of the present invention.

Referring to FIG. 10, Embodiment 7 of a video file playing system according to the present invention may include a user end apparatus 1001 and a server apparatus 1002. The user end apparatus 1001 may be the user end apparatus described in the user end apparatus embodiments, and the server apparatus 1002 may be the server apparatus described in the server apparatus embodiments. As the user end apparatus and the server apparatus are described in detail in the foregoing embodiments, details are not repeated herein.

Persons skilled in the art should understand that all or a part of the steps of the methods according to the embodiments may be implemented by a program instructing relevant hardware. The program may be stored in a computer readable storage medium. The storage medium may be any medium that is capable of storing program codes, such as a read only memory (ROM, Read Only Memory), a random access memory (RAM, Random Access Memory), a magnetic disk, or an optical disk.

The video file playing method and system, the user end apparatus, and the server apparatus are described in detail above. The principle and implementation of the present invention are described herein through specific examples. The description about the embodiments of the present invention is merely provided for ease of understanding of the method and core ideas of the present invention. Persons skilled in the art may make variations and modifications to the present invention in terms of the specific implementations and application scopes according to the ideas of the present invention. Therefore, the specification shall not be construed as a limit to the present invention.

What is claimed is:

1. A video file playing method, comprising:
   downloading a video file from a server;
   adding an index area to the video file, wherein the index area comprises items of start address, next file address, and start time;
   according to the start time of the video file, inserting the video file into a local video file queue, wherein a next file address of a previous video file in the local video file queue is set to the start address of the index area of the video file, the next file address of the video file is set to a start address of an index area of a next video file.

2. The method according to claim 1, wherein the step of downloading the video file from the server comprises:
   obtaining, by the user end, a play time input by a user;
   determining whether the video file corresponding to the play time exists locally;
   if the video file doesn't exists locally, sending a video file download request message to the server, wherein the video file download request message carries the play time; and
   receiving the video file sent by the server.

3. The method according to claim 2, after the step of determining whether a video file corresponding to the play time exists locally, further comprising:
   determining whether the video file exists locally, according to whether there is a local video file, start time and end time of which are respectively before and after the play time, exiting in the local video file queue.

4. The method according to claim 1, wherein the start time of the video file is after an end time of the previous video file, and before a start time of the next video file.

5. A user end apparatus, comprising:
   a download module, configured to download a video file from a server;
   an index area addition module, configured to add an index area to the video file, wherein the index area comprises items of a start address, a next file address, and a start time;
   a video file queue management module, configured to, according to the start time of the video file, insert the video file into a local video file queue, wherein a next file address of a previous video file in the local video file queue is set to the start address of the index area of the video file, the next file address of the video file is set to a start address of an index area of a next video file; and
   a play module, configured to play the video file.

6. The apparatus according to claim 5, wherein the download module comprises:
   a first obtaining unit, configured to obtain a play time input by a user;
   a determination unit, configured to determine whether the video file corresponding to the play time exists locally;
   a sending unit, configured to, when the determination unit determines that the video file doesn't exists locally, send a video file download request message to the server, wherein the video file download request message carries the play time; and
   a receiving unit, configured to receive the video file sent by the server.

7. The apparatus according to claim 6, wherein the determination unit determines whether the video file corresponding to the play time exists locally according to whether there is a local video file, start time and end time of which are respectively before and after the play time, exiting in the local video file queue.

8. The apparatus according to claim 5, wherein the start time of the video file is after an end time of the previous video file, and before a start time of the next video file.

9. A non-transitory computer-readable storage medium having computer executable instructions for causing a computer to perform steps comprising:
   downloading a video file from a server;
   adding an index area to the video file, wherein the index area comprises items of start address, next file address, and start time;
   according to the start time of the video file, inserting the video file into a local video file queue, wherein a next file address of a previous video file in the local video file queue is set to the start address of the index area of the video file, the next file address of the video file is set to a start address of an index area of a next video file.

* * * * *